Figure 1:
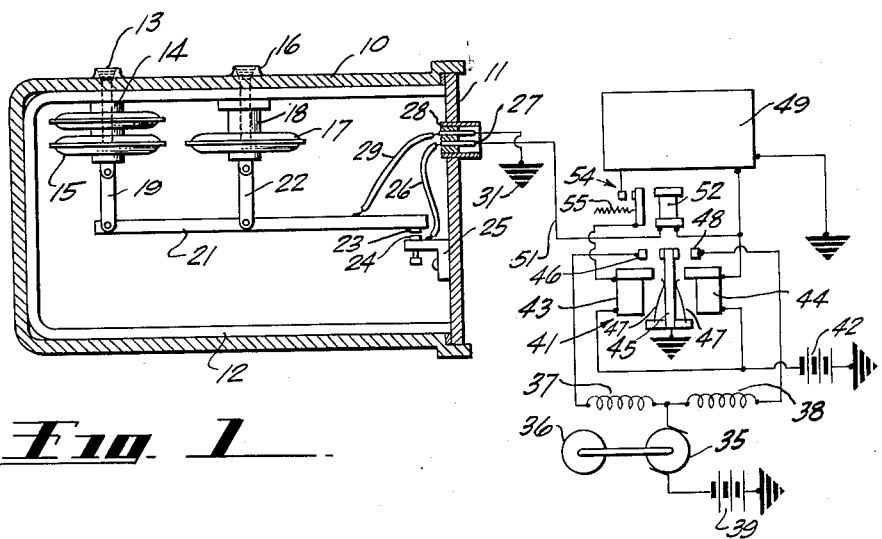

Feb. 23, 1954  B. E. DEL MAR  2,669,922

CABIN PRESSURE CONTROL INSTRUMENT

Filed May 21, 1952

INVENTOR.
BRUCE E. DEL MAR
BY
ATTORNEY

Patented Feb. 23, 1954

2,669,922

UNITED STATES PATENT OFFICE 2,669,922

CABIN PRESSURE CONTROL INSTRUMENT

Bruce E. Del Mar, Los Angeles, Calif., assignor to Douglas Aircraft Company, Inc., Santa Monica, Calif.

Application May 21, 1952, Serial No. 289,156

9 Claims. (Cl. 98—1.5)

This invention relates to pressure responsive instruments and more particularly to such instruments especially useful in systems for regulating or controlling pressure of the air in an aircraft cabin.

This application is a division of my copending application, Ser. No. 200,045, now Patent No. 2,612,828, which application is a continuation-in-part of previously filed applications Ser. No. 443,233, now Patent No. 2,549,672, and Ser. No. 669,366, now Patent No. 2,549,673.

In pressure controlling systems shown in my above identified patents, as in all such systems, the absolute pressure of cabin air is varied by controllably varying the rate of air discharge from the cabin relative to the rate of the air delivery to the cabin. The air delivered to the cabin is furnished by superchargers or like blowers which are capable of delivering air to the cabin at pressures greater than flight or ambient pressure. Such blowers will operate efficiently so long as the ratio of the outlet pressure to inlet pressure does not exceed the design limit of the blower. This ratio is commonly termed the compression ratio of the blower and is one which can be readily determined.

As the aircraft ascends the ratio of cabin absolute pressure to flight absolute pressure will, of course, increase if a comfortable pressure schedule is maintained for the cabin. This ratio of pressures actually very closely approximates the ratio of outlet pressure to inlet pressure of the air delivery means as ambient air at ambient pressure is drawn into the air delivery means and forced into the cabin under a pressure higher than cabin air pressure. Once the ratio of cabin absolute pressure to flight absolute pressure exceeds the compression ratio of the air delivery means, the latter fail to furnish air to the cabin at controllable or known pressures. The resultant pressure surgings or pulsations obviously will produce rapid changes in the cabin absolute pressure and render control of cabin absolute pressure along a desired schedule substantially impossible. The compression ratio of the air delivery means of any pressurizable cabin aircraft, therefore, imposes a limit on the altitude to which the aircraft can be flown.

The instrument of the present invention in the broadest aspects thereof comprises means, operable in accordance with a selected ratio of cabin absolute pressure to flight absolute pressure, adapted to cooperate with the means of the system for varying the rate of air discharge from the cabin relative to the rate of air delivery to the cabin to maintain such ratio substantially constant above an altitude at which cabin absolute pressure would tend to exceed the value necessary to provide the preselected ratio. The instrument of the present invention thus insures that the superchargers or blowers will not be forced, even at extremely high altitude flight, to operate against a compression ratio beyond the range in which the superchargers or blowers will give satisfactory service. This makes it possible to maintain the supercharger system in operation throughout the entire altitude range in which the aircraft is capable of flight without limitation by characteristics of the air supply equipment used.

The instrument of the present invention, as it will controllably maintain cabin absolute pressure in accordance with a preselected ratio of cabin absolute pressure to flight absolute pressure, is also capable of maintaining cabin absolute pressure in accordance with a selected ratio which is determined to be the maximum ratio of said pressures allowable for physiological safety of occupants of a pressurized airplane which is subject to possible puncture of cabin wall structure by enemy gun fire.

Figure 2:
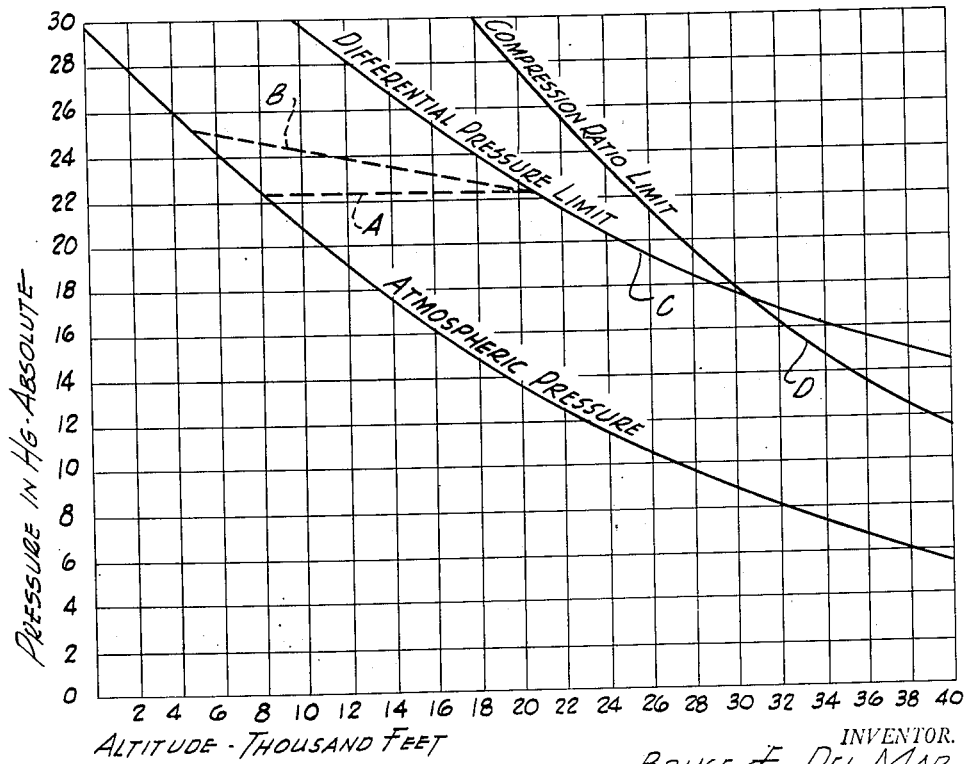

Other features and advantages of the present invention will be hereinafter apparent from the following description, particularly when taken in connection with the accompanying drawing, in which Figure 1 is a view partly in section and partly in elevation of the instrument of the present invention together with a diagrammatic showing of one control system with which the instrument can be used;

Figure 2 is a graphic plot of the pertinent pressure control relations between cabin pressure and flight altitude for explanation of the present invention.

The instrument of the present invention, referring now to the drawing and more particularly to Figure 1 thereof, comprises an open ended case or housing 10 of insulating material impervious to air. The open end of the case 10 is closed and hermetically sealed by a closure element 11 held in position by suitable clamping means, not shown. To maintain the hermetic seal of the case, suitable gasket elements are preferably used between the closure element 11 and the open end of the case 10. This is important in the instrument of the present invention for the interior thereof is evacuated for a purpose to be presently described.

The case 10 houses a suitable frame 12 of rigid material which is removably mounted within the case through the opening hermetically sealed by the closure element 11. The frame 12, as will be seen, forms a support element carrying the operative members of the instrument and permits removal of the operative elements from the case for repair merely by sliding the frame 12 out of the case after the closure element 11 has been removed from the open end thereof.

Th one wall of the case 10 is formed with a tapped aperture 13 adapted to receive the one end of a tube or conduit, not shown, but which leads to ambient flight pressure. A hollow spool element 14, carried by the frame 12 and fixed to the interior wall surface of the case 10, supports a capsule assembly 15, the interior of which is in communication with the opening 13 through the hollow spool 14 so that the interior of this capsule assembly is subject to ambient flight pressure.

The wall of the case 10 is formed with a second tapped aperture 16 intended to be used to secure one end of a tube or conduit, not shown, leading to cabin absolute pressure. A capsule assembly 17 is mounted to the frame 12 through a hollow spool element 18 also secured to the interior wall surface of the case to the end that the interior of the capsule assembly 17 communicates with the opening 16 and is therefore subject to cabin absolute pressure. As the case 10 is evacuated, it will thus be seen that the capsule assembly 15 will move in response to changes in flight absolute pressure while the capsule assembly 17 will move in response to changes in cabin absolute pressure.

The movable end of the capsule assembly 15 is pivotally interconnected by a short link 19 to the one end of a control arm 21. The intermediate portion of this control arm is pivotally connected by a link 22 to the movable end of the cabin pressure responsive capsule 17. It will thus be seen that the control arm 21 is angularly moved as the capsule assemblies 15 and 17 expand and contract in response to changes in the pressures to which they are internally subjected.

The free end of the control arm 21 carries a contact element 23 which is movable into and out of engagement with a contact member 24 carried by a small bracket 25 insulatedly fixed to the inner side of the closure element 11. The contact 24 is connected by a suitable lead 26 to a contact prong 27 forming a part of a connector plug 28 mounted in an opening formed in the closure element 11. The connector plug is hermetically sealed as is also the opening in which it is mounted. A lead 29 interconnects the control arm 21 and a suitable ground 31 through the connector plug 28 as shown.

The connector plug 28 forms a means by which the instrument of the present invention can be electrically interconnected into a control circuit of the cabin pressure regulating system. To illustrate the operation of the instrument, there is illustrated in Figure 1 a schematic showing of a control circuit with which the instrument can be used. In this system a motor 35, through a suitable gear train not shown, operates a valve 36 used to control the rate of air discharge from the cabin. The motor 35 is reversible and may be energized either through the field coil 37 or the field coil 38 by power from some suitable source such as the battery 39 to move the valve in alternate directions depending upon the direction of rotation of the motor 35.

Automatic control of the valve 36 is effected through a control relay 41 which, as shown for illustrative purposes, is essentially a power amplifier in which very small currents from a battery 42 can be used to selectively energize the coils 43 and 44 of the relay 41 to control a flow of relatively large currents in the circuits of the motor field coils 37 and 38. Energization of the relay coil 43 causes the armature 45 of the relay to move to the left, as viewed in Figure 1, and into engagement with a contact 46 against the action of one of a pair of centering springs 47 to complete a circuit from the battery 39 through the circuit of the field coil 37. Energization of this field coil produces such rotation of the motor to drive the valve 36 toward a closing position to decrease the rate of air discharge from the cabin.

Energization of relay coil 44 causes the armature 45 of the relay to move to the right, as viewed in Figure 1, to engage with contact 48 against the action of the other of the pair of centering springs 47 to complete a circuit from the battery 39 through the circuit of the field coil 38. The completion of this circuit, as should now be understood, causes the motor to drive the valve 36 in the opposite direction, that is, towards an open position to increase the rate of air discharge from the cabin.

Energization of the relay 41 is in part controlled by pressure responsive means schematically shown at 49. The control means schematically shown at 49 may comprise any control elements desired which will regulate cabin pressure along some preselected or desired pressure schedule as the aircraft is flown at altitudes at which pressurization is desired.

It will be seen that the contact member 27 of the connector plug 28 is electrically connected into the control circuit by a conductor 51 which includes the coil 52 of a relay operated switch 54. It will be seen that the switch 54 is connected into the circuit of relay coil 43 and this switch is normally held in a circuit closing position by a spring 55. As the coil of the relay operating the switch forms a part of the conductor circuit 51, this coil when energized will open the switch 54 against the action of the spring 55.

Once the switch 54 is moved to its open circuit position the control means 49 is rendered inoperative to energize relay coil 43. Thus, if at the time the contact 23 of the control arm 21 moves into engagement with the contact 24 control means 49 is energizing relay coil 43 and the valve 36 is moving toward closed position, the relay operated switch 54 will be moved to its open circuit position simultaneously with energization of the coil 44 of the relay 41. This, as should now be understood, renders control means 49 inoperative to continue to control valve closing relay 43 and the valve will be moved toward open position under the control of the instrument of the present invention.

The particular relationship of the capsules and the manner in which the link means interconnects the capsules with the control arm, together with position of the contact 24, will obviously determine the value of the ratio of pressures which will result in movement of the contact 23 into engagement with the fixed contact 24. In any event, the ambient flight pressure capsule 15 will in effect pivotally mount the one end of the control arm 21 and the cabin absolute pressure capsule 22, as the same expands and contracts in response to changing cabin absolute pressure, will arcuately move the control arm about the axis established by the pivotal connection between the arm 21 and the link 19. It will thus be seen that an increasing cabin absolute pressure will bring about an expansion of the capsule assembly 17 to move the control arm 21, regardless of the position of the capsule assembly 15, in a clockwise direction to move contact element 23 toward contact 24. The amount of angular movement of the arm 21 to bring about engagement of the contacts 23 and 24 will thus depend upon the ratio of pressures to which the capsule assemblies are subjected.

As the capsule assemblies 15 and 17 are subject to and movable in response to changes in ambient flight pressure and cabin absolute pressure, the contact 23 of the control arm 21 will be moved into engagement with the contact 24 whenever the ratio of cabin absolute pressure to ambient flight pressure equals the preselected ratio. Thus the action of the instrument of the present invention effectively prevents the ratio of pressures from exceeding the preselected ratio for as soon as the preselected ratio is exceeded, the instrument acts to open the valve 36 to increase air outflow from the cabin and thus decrease cabin absolute pressure.

As long as the preselected ratio of pressures exists, it will be seen that the control arm 21 will hold the contact 23 in engagement with the contact 24 and control element 49 is precluded from effecting any control action on the valve 36 which would tend to increase cabin absolute pressure. Once the ratio of cabin absolute pressure to flight ambient pressure drops below the preselected maximum value, control arm 21 will move contact 23 out of engagement with contact 24 and the spring 55 will then act to close the switch 54 at the same time that the coil 44 is de-energized. This again renders the control means 49 operative to control energization of the relay coil 43.

Figure 2 illustrates in graph form, in which flight altitude is plotted against pressure, alternate forms of pressure schedules possible with the control means 49. In one schedule represented by line A, the control means 49 acts to hold the cabin absolute pressure substantially constant after the aircraft has reached an altitude of 8000 feet. In this schedule cabin absolute pressure remains constant at a simulated altitude of 800 feet until the aircraft has ascended to an altitude in the illustration now being explained of approximately 21,000 feet. At this altitude the difference between cabin absolute pressure and ambient flight pressure will have equalled the predetermined differential pressure set by the bursting strength of the cabin. The control means 49 will thereafter control cabin absolute pressure to maintain the cabin differential pressure represented by line C substantially constant until an altitude of approximately 30,500 feet is reached at which time the ratio of cabin absolute pressure to ambient flight pressure reaches the preselected ratio and thereafter the instrument of the present invention acts to control the valve 36, as above explained, to maintain the ratio of cabin absolute pressure to ambient flight pressure substantially constant. This schedule is shown by line D of the figure.

In the schedule represented by line B, control means 49 progressively decreases cabin absolute pressure as the aircraft ascends beyond a 5000 foot altitude until the differential pressure limit is reached. Here again the control means 49 will so operate the valve 36 as to maintain cabin differential pressure substantially constant until the altitude of approximately 30,500 feet is reached. Here again, as in the previously described schedule, the instrument of the present invention will in effect override the control action of the control means 49 and so motivate the motor as to control operation of the valve 36 to maintain the ratio of cabin absolute pressure to ambient flight pressure at the preselected value. This control of cabin absolute pressure is again represented by the line D in the graph of Figure 2.

It will now be seen that the instrument of the present invention is one which is operable in accordance with a selected ratio of cabin absolute pressure to ambient flight pressure and is adapted to cooperate with the valve operating means of a pressure control system to so operate said valve as to maintain the ratio of cabin absolute pressure to ambient flight pressure substantially constant at all altitudes above some datum altitude. The control arm together with the contacts of the instrument form control effecting means adapted to be operatively connected to the valve operating means of a system, such as illustrated in the drawing. The control effecting means so formed is motivated by the pressure change responsive movements of the capsule assemblies to bring about the desired control. The contacts themselves actually actuate the valve operating means, but the control thereof is effected through the control arm and the contacts.

Although the embodiment of the present invention has been herein shown and described as an instrument controlling an electrical system, it is obvious that other types of motivating systems could be used, such as hydraulic or pneumatic, as the particular type of system is not important to the invention herein disclosed.

It is to be understood, therefore, that although the now preferred embodiment of the present invention has been illustrated and disclosed herein, the present invention is not to be limited thereto, for the same is subject to changes in form and detail within the scope of the appended claims.

I claim:

1. An instrument for use in a system for regulating pressure in an aircraft cabin, which system includes means to effect and control air outflow from the cabin, comprising: an evacuated housing to be mounted within said cabin; a first capsule mounted within said housing; means carried by said housing adapted to be connected to ambient flight pressure and communicating with the interior of said first capsule; a second capsule mounted within said housing; means carried by said housing adapted to be connected to cabin absolute pressure and communicating with the interior of said second capsule; control effecting means, including means adapted to be operatively connected to the means of the system effecting and controlling outflow of air from the cabin; and means motivating said control effecting means through the resultant movements of said capsules as the same conjointly move in response to changes in cabin absolute pressure and ambient flight pressure to decrease cabin absolute pressure to maintain a preselected ratio of cabin absolute pressure to ambient flight pressure whenever cabin absolute pressure tends to exceed a value which produces a ratio of cabin absolute pressure to ambient flight pressure in excess of said preselected ratio.

2. A pressure regulating device for use in a system for regulating pressure within an aircraft cabin, which system includes an outflow valve controlled by pressure increasing or pressure decreasing means of the system, comprising: a housing to be mounted within said cabin; a first capsule mounted within said housing responsive solely to changes in cabin absolute pressure; a second capsule mounted within said housing and responsive solely to changes in ambient flight pressure; control effecting means, including means movably mounted within said housing and a second means adapted to be operatively connected to the pressure decreasing means of said system, for controlling operation of said decreasing means; means for operatively connecting said capsules to said movably mounted means whereby said latter means is moved by the conjoint movement of said capsules as the same respond to changes in cabin absolute pressure and ambient flight pressure, respectively, to so motivate said control effecting means that the latter is adapted to control operation of said pressure decreasing means controlling said outflow valve to decrease cabin absolute pressure whenever the ratio of cabin absolute pressure to flight ambient pressure exceeds a predetermined maximum value.

3. An instrument for use in a system for regulating pressure in an aircraft cabin, which system includes means to effect and control air outflow from the cabin, comprising: a housing to be mounted within said cabin; a first capsule mounted within said housing and responsive solely to changes in cabin absolute pressure; a second capsule mounted within said housing and responsive solely to changes in ambient flight pressure; control effecting means, including means movably mounted within said housing and a second means adapted to be operatively connected to the means of said system for effecting and controlling outflow of air from the cabin; means for operatively connecting said capsules to said movably mounted means whereby said latter means is moved by the conjoint movement of said capsules as said capsules respond to changes in cabin absolute pressure and ambient flight pressure to so motivate said control effecting means that the latter is adapted to control operation of said outflow effecting and controlling means of said system to vary cabin absolute pressure in accordance with a preselected ratio of cabin absolute pressure to ambient flight pressure.

4. An instrument for use in a system for regulating pressure in an aircraft cabin, which system includes means to effect and controllably increase air outflow from the cabin, comprising: a sealed housing to be mounted within said cabin, said housing internally subject to a substantially constant pressure other than cabin absolute pressure or ambient flight pressure; a first capsule mounted within said housing and responsive to changes in cabin absolute pressure; a second capsule mounted within said housing and responsive to changes in ambient flight pressure; control effecting means, including means adapted to be operatively connected to the means of said system for effecting and controlling increase of outflow of air from the cabin; means operatively connecting said first and second capsules to said control effecting means whereby the latter is motivated by pressure change responsive movements of said capsules, said capsules being so organized and arranged, whenever the ratio of cabin absolute pressure to ambient flight pressure exceeds a preselected value, to conjointly act to produce such motivation of said control effecting means that the latter is adapted to control operation of said outflow effecting and controlling means of said system to increase air outflow and thereby decrease cabin absolute pressure to maintain cabin absolute pressure in accordance with said preselected ratio of cabin absolute pressure to ambient flight pressure.

5. A pressure regulating device for use in a system for regulating pressure in an aircraft cabin whereinto air is continuously supplied by an air delivery means and including a controllable valve means for regulating air outflow from and hence pressure within said cabin, comprising: an evacuated housing to be mounted within said cabin; a frame removably mounted within said housing; a pair of pressure responsive capsule assemblies mounted on said frame in a side-by-side relationship; means for communicating cabin absolute pressure to the interior of one of said capsule assemblies; means carried by said housing adapted to be connected to ambient flight pressure and communicating with the interior of the other of said capsule assemblies; a control arm; means pivotally connecting the movable end of each capsule assembly to said control arm at spaced points therealong whereby said control arm is pivotally moved in response to conjoint movement of said capsule assemblies in response to changes in cabin absolute pressure and ambient flight pressure; and means adapted to be operatively connected to said valve means and including means cooperative with said control arm as it is moved under the conjoint influence of changes in cabin absolute pressure and ambient flight pressure to control operation of said valve means to limit the difference between cabin absolute pressure and ambient flight pressure so that the ratio of cabin absolute pressure to ambient flight pressure is maintained in accordance with a predetermined value.

6. An instrument for use in a system for regulating pressure in an aircraft cabin, which system includes means to effect and control air outflow from the cabin, comprising: an evacuated housing to be mounted within said cabin; a pair of pressure responsive capsule assemblies mounted in a side-by-side relationship within said housing; means for communicating cabin absolute pressure to the interior of one of said capsule assemblies; means for communicating ambient flight pressure to the interior of the other of said capsule assemblies; a control arm; means for pivotally connecting the movable end of each capsule assembly to said control arm at spaced points therealong whereby said control arm is pivotally moved in response to the conjoint movement of said capsule assemblies as the latter respond, respectively, to changes in cabin absolute pressure and ambient flight pressure; and means carried by said housing and adapted to be connected to the outflow effecting and controlling means of said system and coacting with said control arm as it is moved by the conjoint resultant movements of said capsule assemblies responding to changes in cabin absolute pressure and ambient flight pressure, respectively, to produce such motivation of said outflow effecting and controlling means of the system to vary cabin absolute pressure in accordance with a preselected ratio of cabin absolute pressure to ambient flight pressure.

7. A pressure regulating device for use in a system for regulating pressure within an aircraft cabin, which system includes an outflow valve controlled by pressure increasing or pressure decreasing means of the system, comprising: an evacuated housing to be mounted within said cabin; a first capsule mounted within said housing internally subject to changes in cabin absolute pressure; a second capsule mounted within said housing and internally subject to changes in ambient flight pressure; control effecting means, including means movably mounted within said housing and second means adapted to be operatively connected to the pressure decreasing means of said system, for controlling operation of said decreasing means; means for operatively connecting said capsules to said movably mounted means whereby said latter means is moved by the conjoint movement of said capsules as the same respond to changes in cabin absolute pressure and ambient flight pressure, respectively, to so motivate said control effecting means that the latter is adapted to control operation of said pressure decreasing means controlling said outflow valve to increase air outflow from said cabin and thereby decrease cabin absolute pressure whenever the ratio of cabin absolute pressure to flight ambient pressure exceeds a predetermined maximum value.

8. An instrument for use in a system for regulating pressure in an aircraft cabin, which system includes means to effect and control air outflow from the cabin, comprising: a housing, internally subject to a pressure other than cabin absolute pressure or ambient flight pressure, to be mounted within said cabin; a first capsule mounted within said housing; means carried by said housing adapted to be connected to ambient flight pressure and communicating with the interior of said first capsule whereby the latter is internally subject to, and movable in response to changes in, ambient flight pressure; a second capsule mounted within said housing; means carried by said housing adapted to be connected to cabin absolute pressure and communicating with the interior of said second capsule whereby the latter is to be internally subject to, and movable in response to changes in, cabin absolute pressure; control effecting means, including means adapted to be operatively connected to the means of said system for effecting and controlling outflow of air from the cabin; means operatively connecting said first and second capsules to said control effecting means whereby the latter is motivated by the conjoint pressure change responsive movements of said capsules, said capsules being so operatively connected to said control effecting means and being so organized, whenever the ratio of cabin absolute pressure to flight absolute pressure exceeds a preselected value, to produce such motivation of said control effecting means that the latter is adapted to control operation of said outflow effecting and controlling means of said system to vary cabin absolute pressure in accordance with said preselected ratio of cabin absolute pressure to ambient absolute pressure.

9. An instrument for use in a system for regulating pressure in an aircraft cabin, which system includes means to effect and control air outflow from the cabin, comprising: an evacuated housing to be mounted within said cabin; a control arm within said housing; a first capsule mounted within said housing; means carried by said housing adapted to be connected to ambient flight pressure and communicating with the interior of said first capsule whereby the latter is internally subject to, and movable in response to changes in, ambient flight pressure; link means pivotally interconnecting said first capsule and the one end of said control arm; a second capsule mounted within said housing; means carried by said housing adapted to be connected to cabin obsolute pressure and communicating with the interior of said second capsule whereby the latter is to be internally subject to and movable in response to changes in cabin absolute pressure; link means pivotally interconnecting said second capsule and said control arm intermediate the ends thereof, said control arm being motivated by the conjoint pressure change responsive movements of said capsules; and control activating means carried by said housing, including means adapted to be operatively connected to the means of said system for effecting and controlling outflow of air from the cabin and coacting with said control arm to control operation of said outflow effecting and controlling means in response to a preselected movement of said control arm resulting from pressure change responsive movements of said capsules to produce such motivation of said outflow effecting and controlling means to vary cabin absolute pressure in accordance with a preselected ratio of cabin absolute pressure to ambient flight pressure.

BRUCE E. DEL MAR.

References Cited in the file of this patent

UNITED STATES PATENTS

| Number | Name | Date |
|---|---|---|
| 2,450,076 | Bechberger | Sept. 28, 1948 |
| 2,549,672 | Del Mar | Apr. 17, 1951 |
| 2,549,690 | Klemperer | Apr. 17, 1951 |
| 2,612,828 | Del Mar | Oct. 7, 1952 |

FOREIGN PATENTS

| Number | Country | Date |
|---|---|---|
| 514,055 | France | Nov. 8, 1920 |